US011695740B2

(12) United States Patent
Ou

(10) Patent No.: US 11,695,740 B2
(45) Date of Patent: Jul. 4, 2023

(54) ANONYMIZATION METHOD AND APPARATUS, DEVICE, AND STORAGE MEDIUM

(71) Applicant: Huawei Cloud Computing Technologies Co., Ltd., Gui'an New District (CN)

(72) Inventor: Duanhao Ou, Dongguan (CN)

(73) Assignee: Huawei Cloud Computing Technologies Co., Ltd., Gui'an New District (CN)

( * ) Notice: Subject to any disclaimer, the term of this patent is extended or adjusted under 35 U.S.C. 154(b) by 322 days.

(21) Appl. No.: 17/067,388

(22) Filed: Oct. 9, 2020

(65) Prior Publication Data

US 2021/0029091 A1 Jan. 28, 2021

Related U.S. Application Data

(63) Continuation of application No. PCT/CN2019/082057, filed on Apr. 10, 2019.

(30) Foreign Application Priority Data

Apr. 11, 2018 (CN) .......................... 201810319754.1

(51) Int. Cl.
*H04L 9/40* (2022.01)
(52) U.S. Cl.
CPC ................................ *H04L 63/0421* (2013.01)
(58) Field of Classification Search
CPC ....................... H04L 63/0421; H04L 2209/42; H04L 9/0631
See application file for complete search history.

(56) References Cited

U.S. PATENT DOCUMENTS 8,458,487 B1 6/2013 Palgon et al.
8,626,749 B1 * 1/2014 Trepetin .............. G06F 21/6254
707/722

(Continued)

FOREIGN PATENT DOCUMENTS

CN 102567903 A 7/2012
CN 104717225 A 6/2015

(Continued)

OTHER PUBLICATIONS

Ohno et al., "Blind Watermarking Method for Anonymized Data", Nov. 2017, Fifth International Symposium on Computing and Networking, pp. 139-145 (Year: 2017).*
"Worrying, plain text SMS content can be obtained by monitoring in my country's GSM network", Webcloner, retrieved from website; https://linux.cn/thread-12594-1-1.html, total 2 pages (Apr. 8, 2014).
"Opinion May 2014 on Anonymisation Techniques", Article 29 Data Protection Working Party, 0829/14/ENWP216, total 37 pages, (Adopted on Apr. 10, 2014).

*Primary Examiner* — Kenneth W Chang
(74) *Attorney, Agent, or Firm* — Leydig, Voit & Mayer, Ltd.

(57) ABSTRACT

This disclosure provides an anonymization method and apparatus, a device, and a storage medium, and pertains to the field of communications network technologies. The method includes: receiving a data obtaining request of a first terminal, and obtaining requested target data based on the data obtaining request; determining behavior data generated when the target data is obtained; determining, based on the behavior data, a first permutation character sequence corresponding to the target data; and anonymizing, based on the first permutation character sequence, a to-be-anonymized character string in the target data, and outputting the anonymized target data. In this disclosure, because the behavior data is different each time and is not easy to crack, anonymization is implemented without relying on plaintext information, thereby improving anonymization security and meeting anonymization requirements specified by laws.

18 Claims, 9 Drawing Sheets

(56) References Cited

U.S. PATENT DOCUMENTS

| | | | |
|---|---|---|---|
| 8,726,398 B1* | 5/2014 | Tock | H04L 63/0407 |
| | | | 726/28 |
| 9,866,454 B2 | 1/2018 | Srivastava | |
| 2008/0118150 A1* | 5/2008 | Balakrishnan | G06F 21/6254 |
| | | | 382/176 |
| 2008/0181405 A1* | 7/2008 | Seppanen | H04L 9/0637 |
| | | | 380/279 |
| 2013/0080774 A1 | 3/2013 | Combet et al. | |
| 2013/0205406 A1* | 8/2013 | Moskowitz | H04L 9/065 |
| | | | 726/27 |
| 2014/0156679 A1 | 6/2014 | Tolbert et al. | |
| 2015/0096040 A1 | 4/2015 | Mattsson et al. | |
| 2016/0034442 A1 | 2/2016 | Levy et al. | |
| 2017/0220818 A1* | 8/2017 | Nagasundaram | H04L 63/107 |

FOREIGN PATENT DOCUMENTS

| | | |
|---|---|---|
| CN | 105187265 A | 12/2015 |
| CN | 103313246 B | 2/2016 |
| CN | 105512523 A | 4/2016 |
| CN | 106548085 A | 3/2017 |
| CN | 106874788 A | 6/2017 |
| CN | 106992991 A | 7/2017 |
| CN | 107430660 A | 12/2017 |

* cited by examiner

ANONYMIZATION METHOD AND APPARATUS, DEVICE, AND STORAGE MEDIUM

CROSS-REFERENCE TO RELATED APPLICATIONS

This application is a continuation of International Application No. PCT/CN2019/082057 filed on Apr. 10, 2019, which claims priority to Chinese Patent Application No. 201810319754.1, filed on Apr. 11, 2018. The disclosures of the aforementioned applications are hereby incorporated by reference in their entireties.

TECHNICAL FIELD

This disclosure relates to the field of communications network technologies, and in particular, to an anonymization method and apparatus, a device, and a storage medium.

BACKGROUND

During development and testing of a new system or cutover between a new system and an old system, an application platform needs to obtain data from an existing production environment of a customer and then test a function or a system based on the data. User privacy is violated if the obtained data involves personal data (such as an ID card number, a mobile phone number, an email address, or a name). Therefore, the application platform needs to anonymize the personal data.

Currently, the application platform implements anonymization mainly by performing encryption permutation on characters in the personal data. The process may be as follows: the application platform obtains a to-be-anonymized character string in the personal data, obtains, based on a format of the character string, a first permutation character sequence corresponding to the character string, and performs encryption scrambling on the first permutation character sequence based on an encryption key to obtain a second permutation character sequence. For any character in the character string, the application platform replaces, based on a location of the character in the first permutation character sequence, the character with a character corresponding to the location in the second permutation character sequence, to obtain an anonymized character string. For example, if the to-be-anonymized character string is the last four digits 7541 of a mobile phone number and the first permutation character sequence is {0, 1, 2, 3, 4, 5, 6, 7, 8, 9}, the application platform performs encryption scrambling on the first permutation character sequence to obtain the second permutation character sequence {9, 5, 1, 4, 6, 8, 2, 3, 7, 0}, and anonymizes the character string based on a location of the character string 7541 in the first permutation character sequence, to obtain 3865.

In a process of implementing this disclosure, the inventor finds that the prior art has at least the following problem.

After the format of the character string is determined, the first permutation character sequence corresponding to the character string is fixed, and the encryption key is usually fixed. As a result, once figuring out the encryption key, an attacker can obtain the second permutation character sequence based on the first permutation character sequence, and can restore the anonymized character string. Consequently, anonymization security is poor and does not meet anonymization requirements specified by laws.

SUMMARY

To resolve the problem in the prior art, embodiments of this disclosure provide an anonymization method and apparatus, a device, and a storage medium. The technical solutions are as follows.

According to a first aspect, an embodiment of the disclosure provides an anonymization method. The method includes:

receiving a data obtaining request of a first terminal, and obtaining requested target data based on the data obtaining request;

determining behavior data generated when the target data is obtained;

determining, based on the behavior data, a first permutation character sequence corresponding to the target data; and anonymizing, based on the first permutation character sequence, a to-be-anonymized character string in the target data, and outputting the anonymized target data.

In this embodiment of this disclosure, the first permutation character sequence is determined based on the behavior data generated when the target data is obtained, and anonymization is performed based on the first permutation character sequence. Because the behavior data is different each time and is not easy to crack, anonymization is implemented without relying on plaintext information, thereby improving anonymization security and meeting anonymization requirements specified by laws.

In a first possible implementation of the first aspect, the behavior data includes a user identifier of a user requesting to obtain the target data, a system time for obtaining the target data, and a system identifier of a system for obtaining the target data.

In this embodiment of this disclosure, the behavior data includes the user identifier of the user requesting to obtain the target data, the system time for obtaining the target data, and the system identifier of the system for obtaining the target data. In this way, after the target data is leaked, this can help an auditor trace and audit the leak behavior of the user.

In a second possible implementation of the first aspect, the determining, based on the behavior data, a first permutation character sequence corresponding to the target data includes:

determining at least one to-be-anonymized character string in the target data according to an anonymization rule of the target data;

obtaining, based on each character format of the at least one character string and a quantity of binary digits that can be embedded into a character in each character format, a second permutation character sequence corresponding to the character format;

converting the behavior data into a watermark ciphertext sequence; and for any character in the watermark ciphertext sequence, obtaining a permutation character that is in the second permutation character sequence corresponding to a character format of the character and that has location information indicating the character, and replacing the character with the permutation character to obtain the first permutation character sequence.

In this embodiment of this disclosure, the behavior data is converted into the watermark ciphertext sequence, and the character in the second permutation character sequence is replaced with the character in the watermark ciphertext sequence based on the location information that is of the character in the watermark ciphertext sequence and that is in the second permutation character sequence. In this way, the watermark ciphertext sequence is embedded in an anonymization replacement process. Because a placeholder of the replaced character is used as an embedded carrier of the watermark ciphertext sequence, no extra space is required to store the watermark ciphertext sequence, thereby saving space.

In a third possible implementation of the first aspect, the converting the behavior data into the watermark ciphertext sequence includes:

converting the behavior data into binary data to obtain a binary sequence;

grouping the binary sequence based on a quantity of binary digits that can be embedded into each type of character in each character string, to obtain a plurality of groups; and converting a binary number in each group into a decimal number to obtain the watermark ciphertext sequence.

In a fourth possible implementation of the first aspect, the converting the behavior data into binary data to obtain the binary sequence includes:

obtaining a first encryption key; and encrypting the behavior data based on the first encryption key to obtain the binary sequence.

In this embodiment of this disclosure, the first encryption key is introduced to encrypt the watermark ciphertext sequence. In this way, no one can forge or illegally obtain the embedded watermark ciphertext sequence without knowing the first encryption key. Therefore, this disclosure can effectively prevent the watermark ciphertext sequence in an anonymized data set from being maliciously forged (e.g., counterfeited) or illegally obtained, thereby further improving security.

In a fifth possible implementation of the first aspect, the obtaining, based on each character format of the at least one character string and the quantity of binary digits that can be embedded into the character in each character format, the second permutation character sequence corresponding to the character format includes:

for each character format, obtaining, based on the character format, a third permutation character sequence corresponding to the character format, where the third permutation character sequence includes all characters in the character format; and converting, into a decimal number, a quantity of binary digits that can be embedded into the character in the character format, and obtaining the decimal number of characters from the third permutation character sequence to form the second permutation character sequence corresponding to the character format.

In a sixth possible implementation of the first aspect, the obtaining the decimal number of characters from the third permutation character sequence to form the second permutation character sequence corresponding to the character format includes:

obtaining the decimal number of characters from the third permutation character sequence to form a fourth permutation character sequence; and performing encryption scrambling on the fourth permutation character sequence based on a second encryption key, to obtain the second permutation character sequence corresponding to the character format.

In this embodiment of this disclosure, the second encryption key is introduced to encrypt the fourth permutation character sequence. In this way, no one can forge or illegally obtain the second permutation character sequence without knowing the second encryption key, thereby further improving security.

In a seventh possible implementation of the first aspect, the anonymizing the to-be-anonymized character string in the target data based on the first permutation character sequence includes:

sequentially replacing characters in the to-be-anonymized character string in the target data with characters in the first permutation character sequence, to obtain an anonymized character string.

In this embodiment of this disclosure, the to-be-anonymized character string in the target data is directly replaced with the characters in the first permutation character sequence, thereby shortening an anonymization time and improving efficiency.

In an eighth possible implementation of the first aspect, the anonymizing the to-be-anonymized character string in the target data based on the first permutation character sequence includes:

sequentially replacing characters in at least one to-be-anonymized character string in the target data with characters in the first permutation character sequence, to obtain the permuted target data; and encrypting characters in the permuted target data based on a third encryption key and a preset format-preserving encryption algorithm, to obtain the anonymized target data.

In this embodiment of this disclosure, after the to-be-anonymized character string in the target data is replaced with the characters in the first permutation character sequence, the permuted target data is encrypted based on the third encryption key. No one can restore the target data without knowing the third encryption key, thereby further improving security.

In a ninth possible implementation of the first aspect, before the receiving the data obtaining request, the method further includes:

receiving a login request of the first terminal, where the login request carries a user account and a login password of a user;

performing permission verification on the user based on the user account and the login password; and when the permission verification succeeds, allowing the first terminal to perform a login operation.

In this embodiment of this disclosure, before obtaining the target data, the first terminal performs verification on the user based on the user account and the login password. Only when the verification succeeds, the first terminal is allowed to obtain the target data, thereby ensuring that only an authorized user can obtain the target data, and further improving security.

In a tenth possible implementation of the first aspect, the method further includes:

receiving a behavior data obtaining request of a second terminal, where the behavior data obtaining request carries the anonymized target data; and determining, based on the anonymized target data, the behavior data generated when the target data is obtained.

In this embodiment of this disclosure, after the target data is leaked, the behavior data may be obtained based on the anonymized target data, to help an auditor trace and audit a leakage behavior of the user.

In an eleventh possible implementation of the first aspect, the determining, based on the anonymized target data, the behavior data generated when the target data is obtained includes:

obtaining, based on a character format of the at least one to-be-anonymized character string in the anonymized target data, the second permutation character sequence corresponding to each character format of the at least one character string;

extracting a cyclically repeated character sequence from the anonymized target data, to obtain the watermark ciphertext sequence;

for each character in the watermark ciphertext sequence, converting, into a binary number, location information of the character in the second permutation character sequence corresponding to a character format of the character, to obtain the binary sequence; and converting the binary sequence into the behavior data.

In this embodiment of this disclosure, the watermark ciphertext sequence is extracted from the anonymized target data, and the behavior data is restored based on the watermark ciphertext sequence, so that the leakage behavior of the user can be traced and audited.

In a twelfth possible implementation of the first aspect, the converting the binary sequence into the behavior data includes:

obtaining a first encryption key; and decrypting the binary sequence based on the first encryption key to obtain the behavior data.

In this embodiment of this disclosure, when the behavior data is encrypted, the behavior data is restored based on the first encryption key during restoration of the behavior data, thereby improving accuracy.

In a thirteenth possible implementation of the first aspect, the obtaining, based on a character format of the at least one to-be-anonymized character string in the target data, the second permutation character sequence corresponding to each character format of the at least one character string includes:

obtaining, based on the character format of the at least one to-be-anonymized character string in the target data, a fourth permutation character sequence corresponding to each character format of the at least one character string;

obtaining a second encryption key; and decrypting, based on the second encryption key, the fourth permutation character sequence corresponding to each character format, to obtain the second permutation character sequence corresponding to the character format.

In this embodiment of this disclosure, when the second permutation character sequence is obtained by decrypting the fourth permutation character sequence based on the second encryption key, during restoration of the second permutation character sequence, the fourth permutation character sequence is decrypted based on the second encryption key, to obtain the second permutation character sequence, thereby improving accuracy.

In a fourteenth possible implementation of the first aspect, the extracting a cyclically repeated character sequence from the anonymized target data, to obtain the watermark ciphertext sequence includes:

obtaining a third encryption key;

decrypting the anonymized target data based on the third encryption key and a preset format-preserving encryption algorithm, to obtain the permuted target data; and extracting the cyclically repeated character sequence from the permuted target data, to obtain the watermark ciphertext sequence.

In this embodiment of this disclosure, the anonymized target data is decrypted based on the third encryption key, to obtain the permuted target data, and the watermark ciphertext sequence is extracted from the permuted target data, thereby improving accuracy.

According to a second aspect, an embodiment of this disclosure provides an anonymization apparatus. The apparatus includes:

a receiving unit, configured to receive a data obtaining request of a first terminal;

an obtaining unit, configured to obtain requested target data based on the data obtaining request;

a first determining unit, configured to determine behavior data generated when the target data is obtained, where the first determining unit is further configured to determine, based on the behavior data, a first permutation character sequence corresponding to the target data;

a processing unit, configured to anonymize a to-be-anonymized character string in the target data based on the first permutation character sequence; and an output unit, configured to output the anonymized target data.

In a first possible implementation of the second aspect, the behavior data includes a user identifier of a user requesting to obtain the target data, a system time for obtaining the target data, and a system identifier of a system for obtaining the target data.

In a second possible implementation of the second aspect, the first determining unit includes:

a determining subunit, configured to determine at least one to-be-anonymized character string in the target data according to an anonymization rule of the target data;

a first obtaining subunit, configured to obtain, based on each character format of the at least one character string and a quantity of binary digits that can be embedded into a character in each character format, a second permutation character sequence corresponding to the character format;

a conversion subunit, configured to convert the behavior data into a watermark ciphertext sequence; and a replacing subunit, configured to: for any character in the watermark ciphertext sequence, obtain a permutation character that is in the second permutation character sequence corresponding to a character format of the character and that has location information indicating the character, and replace the character with the permutation character to obtain the first permutation character sequence.

In a third possible implementation of the second aspect, the conversion subunit is further configured to: convert the behavior data into binary data to obtain a binary sequence; group the binary sequence based on a quantity of binary digits that can be embedded into each type of character in each character string, to obtain a plurality of groups; and convert a binary number in each group into a decimal number to obtain the watermark ciphertext sequence.

In a fourth possible implementation of the second aspect, the conversion subunit is further configured to: obtain a first encryption key; and encrypt the behavior data based on the first encryption key, to obtain the binary sequence.

In a fifth possible implementation of the second aspect, the replacing subunit is further configured to: for each character format, obtain, based on the character format, a third permutation character sequence corresponding to the character format, where the third permutation character sequence includes all characters in the character format; and convert, into a decimal number, a quantity of binary digits that can be embedded into the character in the character format, and obtain the decimal number of characters from the third permutation character sequence to form the second permutation character sequence corresponding to the character format.

In a sixth possible implementation of the second aspect, the replacing subunit is further configured to: obtain the decimal number of characters from the third permutation character sequence to form a fourth permutation character sequence; and perform encryption scrambling on the fourth permutation character sequence based on a second encryption key, to obtain the second permutation character sequence corresponding to the character format.

In a seventh possible implementation of the second aspect, the processing unit is further configured to sequentially replace characters in the to-be-anonymized character string in the target data with characters in the first permutation character sequence, to obtain an anonymized character string.

In an eighth possible implementation of the second aspect, the processing unit is further configured to: sequentially replace characters in at least one to-be-anonymized character string in the target data with characters in the first permutation character sequence, to obtain the permuted target data; and encrypt characters in the permuted target data based on a third encryption key and a preset format-preserving encryption algorithm, to obtain the anonymized target data.

In a ninth possible implementation of the second aspect, the apparatus further includes:

the receiving unit, further configured to receive a login request of the first terminal, where the login request carries a user account and a login password of a user;

a verification unit, configured to perform permission verification on the user based on the user account and the login password; and a login unit, configured to: when the permission verification succeeds, allow the first terminal to perform a login operation.

In a tenth possible implementation of the second aspect, the apparatus further includes:

the receiving unit, further configured to receive a behavior data obtaining request of a second terminal, where the behavior data obtaining request carries the anonymized target data; and a second determining unit, configured to determine, based on the anonymized target data, the behavior data generated when the target data is obtained.

In an eleventh possible implementation of the second aspect, the second determining unit includes:

a second obtaining subunit, configured to obtain, based on a character format of the at least one to-be-anonymized character string in the anonymized target data, the second permutation character sequence corresponding to each character format of the at least one character string;

an extraction subunit, configured to extract a cyclically repeated character sequence from the anonymized target data, to obtain the watermark ciphertext sequence; and a conversion subunit, configured to: for each character in the watermark ciphertext sequence, convert, into a binary number, location information of the character in the second permutation character sequence corresponding to a character format of the character, to obtain the binary sequence, where the conversion subunit is further configured to convert the binary sequence into the behavior data.

In a twelfth possible implementation of the second aspect, the conversion subunit is further configured to: obtain a first encryption key; and decrypt the binary sequence based on the first encryption key to obtain the behavior data.

In a thirteenth possible implementation of the second aspect, the second obtaining subunit is further configured to: obtain, based on a character format of the at least one to-be-anonymized character string in the target data, a fourth permutation character sequence corresponding to each character format of the at least one character string; obtain a second encryption key; and decrypt, based on the second encryption key, the fourth permutation character sequence corresponding to each character format, to obtain the second permutation character sequence corresponding to the character format.

In a fourteenth possible implementation of the second aspect, the extraction subunit is further configured to: obtain a third encryption key; decrypt the anonymized target data based on the third encryption key and a preset format-preserving encryption algorithm, to obtain the permuted target data; and extract the cyclically repeated character sequence from the permuted target data, to obtain the watermark ciphertext sequence.

According to a third aspect, an embodiment of this disclosure provides a device. The device includes a processor, a memory, a communications interface, and a bus, where the memory, the processor, and the communications interface are connected by using the bus, the memory stores a programmable instruction, and the processor invokes the programmable instruction stored in the memory, to perform the method according to any one of the first aspect or the possible implementations of the first aspect.

According to a fourth aspect, an embodiment of this disclosure provides a computer-readable storage medium. The storage medium includes an instruction, and when the instruction is run on a computer, the computer is enabled to perform the method according to any one of the first aspect or the possible implementations of the first aspect.

According to a fifth aspect, an embodiment of this disclosure provides a computer program product. The computer program product includes at least one instruction, and the instruction is loaded and executed by a processor to implement the method according to any one of the first aspect or the possible implementations of the first aspect.

DESCRIPTION OF EMBODIMENTS

To make the objectives, technical solutions, and advantages of this disclosure clearer, the following further describes the implementations of this disclosure in detail with reference to the accompanying drawings.

All the foregoing optional technical solutions may be randomly combined to form optional embodiments of this disclosure, and details are not described herein again one by one.

Figure 1:
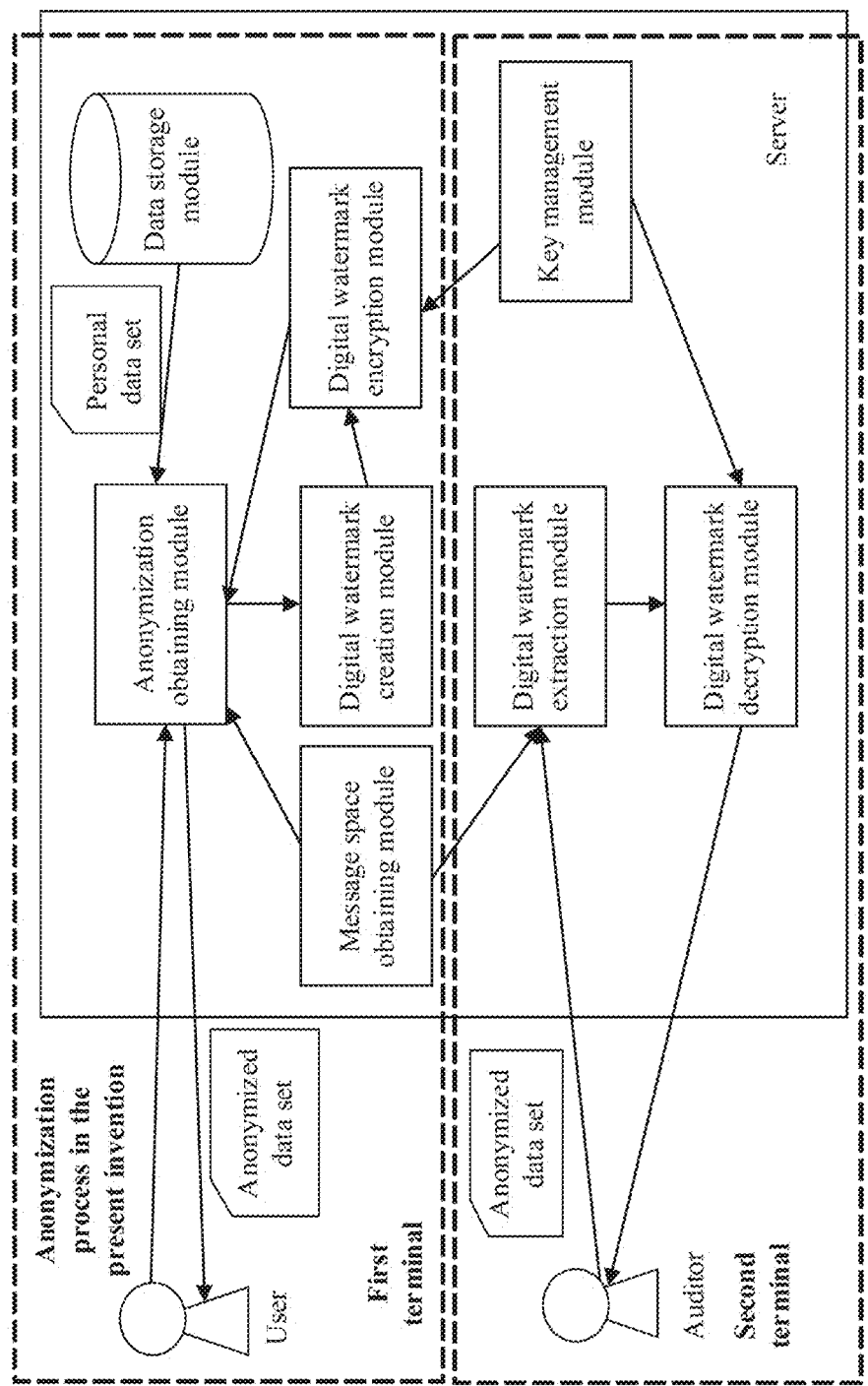
FIG. 1 is a diagram of an architecture of an anonymization system according to an embodiment of this disclosure.

An embodiment of this disclosure provides an architecture of an anonymization system. Referring to FIG. 1, the architecture of the system includes a first terminal and a server. The first terminal may obtain target data from the server by using an application client. The target data may be any data, for example, personal data. The personal data may be any user-related data such as a name, a phone number, an ID card number, or a vehicle identification number.

The server includes an anonymization obtaining module, a data storage module, a message space obtaining module, a digital watermark creation module, a digital watermark encryption module, and a key management module. The anonymization obtaining module is separately connected to the data storage module, the message space obtaining module, the digital watermark creation module, and the digital watermark encryption module. The digital watermark encryption module is separately connected to the digital watermark creation module and the key management module.

The first terminal is configured to: log in to the server, and send a data obtaining request to the anonymization obtaining module after logging in to the server, where the data obtaining request is used to request to obtain target data.

The anonymization obtaining module is configured to: receive the data obtaining request, and obtain the target data from the data storage module based on the data obtaining request.

The data storage module is configured to: obtain the target data, and return the obtained target data to the anonymization obtaining module.

The anonymization obtaining module is further configured to send a watermark creation request to the digital watermark creation module, where the watermark creation request is used to request a watermark ciphertext sequence.

The digital watermark creation module is configured to: receive the watermark creation request, and use, as a digital watermark based on the watermark creation request, behavior data generated when the target data is obtained. The behavior data includes a user identifier of a user that obtains the target data, a system time for obtaining the target data, and a system identifier of a system for obtaining the target data. The system identifier may be a server name, an Internet Protocol (IP) address of the server, or the like.

The digital watermark creation module is further configured to send a digital watermark encryption request to the digital watermark encryption module, where the digital watermark encryption request is used to request the digital watermark encryption module to encrypt the behavior data.

The digital watermark encryption module is configured to: receive the digital watermark encryption request, send a first key obtaining request to the key management module, where the first key obtaining request is used to obtain a first encryption key for encrypting the behavior data, encrypt the behavior data based on the first encryption key, and return the encrypted behavior data to the anonymization obtaining module.

The key management module is configured to: receive the first key obtaining request sent by the digital watermark encryption module, obtain the first encryption key based on the first key obtaining request, and return the first encryption key to the digital watermark encryption module.

The anonymization obtaining module is further configured to: receive the encrypted behavior data, anonymize the target data based on the encrypted behavior data, and output the anonymized target data to the first terminal.

The behavior data includes the user identifier of the user that obtains the target data, the system time for obtaining the target data, and the system identifier of the system for obtaining the target data. Therefore, in this embodiment of this disclosure, a user that obtains the target data can be traced and audited. Correspondingly, the architecture of the system further includes a second terminal, and the server further includes a digital watermark extraction module and a digital watermark decryption module. The digital watermark extraction module is separately connected to the message space obtaining module, the second terminal, and the digital watermark decryption module.

The second terminal is configured to send a behavior data obtaining request to the digital watermark extraction module, where the behavior data obtaining request carries the anonymized target data.

The digital watermark extraction module is configured to: receive the behavior data obtaining request of the second terminal; obtain, based on the anonymized target data and a character format of at least one to-be-anonymized character string in the target data, a second permutation character sequence corresponding to each character format of the at least one character string; extract a cyclically repeated subsequence from the anonymized target data, to obtain a watermark ciphertext sequence; for each character in the watermark ciphertext sequence, convert, into a binary number, location information of the character in the second permutation character sequence corresponding to a character format of the character, to obtain a binary sequence; and send a decryption request to the digital watermark decryption module, where the decryption request carries the binary sequence.

The digital watermark decryption module is configured to: receive the decryption request, obtain the first encryption key from the key management module, decrypt the binary sequence based on the first encryption key, to obtain the behavior data, and send the behavior data to the digital watermark extraction module.

The digital watermark extraction module is further configured to: receive the behavior data, and send the behavior data to the second terminal.

It should be noted that the first terminal and the second terminal may be a same terminal, or may be different terminals. In addition, the first terminal may be any device on which an application having a data access function is installed, such as a mobile phone terminal, a portable Android device (PAD) terminal, or a computer terminal. Similarly, the second terminal may also be any device on which an application having a data access function is installed, such as a mobile phone terminal, a PAD, or a computer terminal.

Figure 2A:
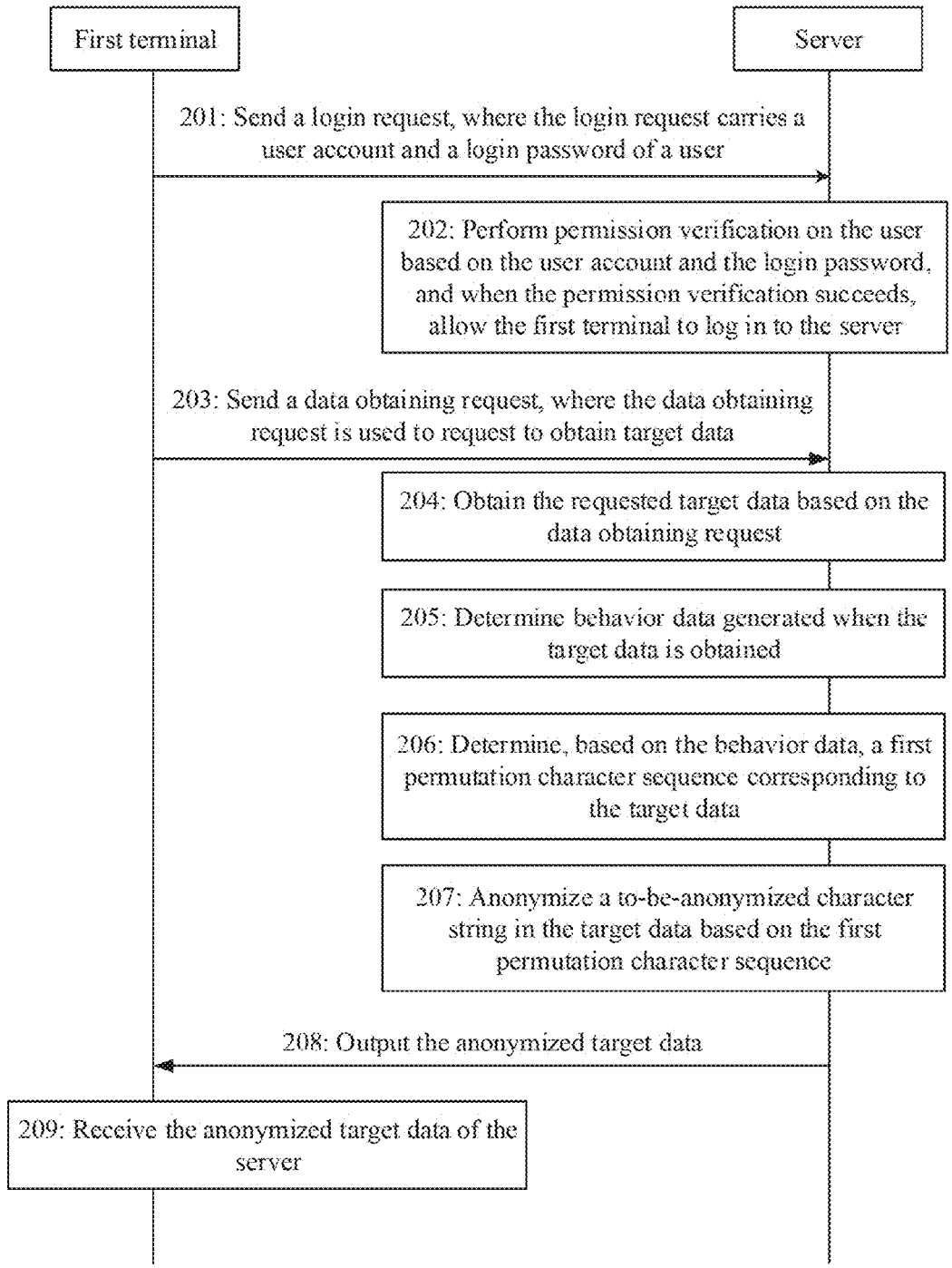
FIG. 2A is a flowchart of an anonymization method according to an embodiment of this disclosure.

An embodiment of this disclosure provides an anonymization method. The method is applied to a first terminal and a server, and is used to anonymize target data that the first terminal requests to obtain. Referring to FIG. 2A, the method includes the following steps.

Step 201: The first terminal sends a login request to the server, where the login request carries a user account and a login password of a user.

Figure 2B:
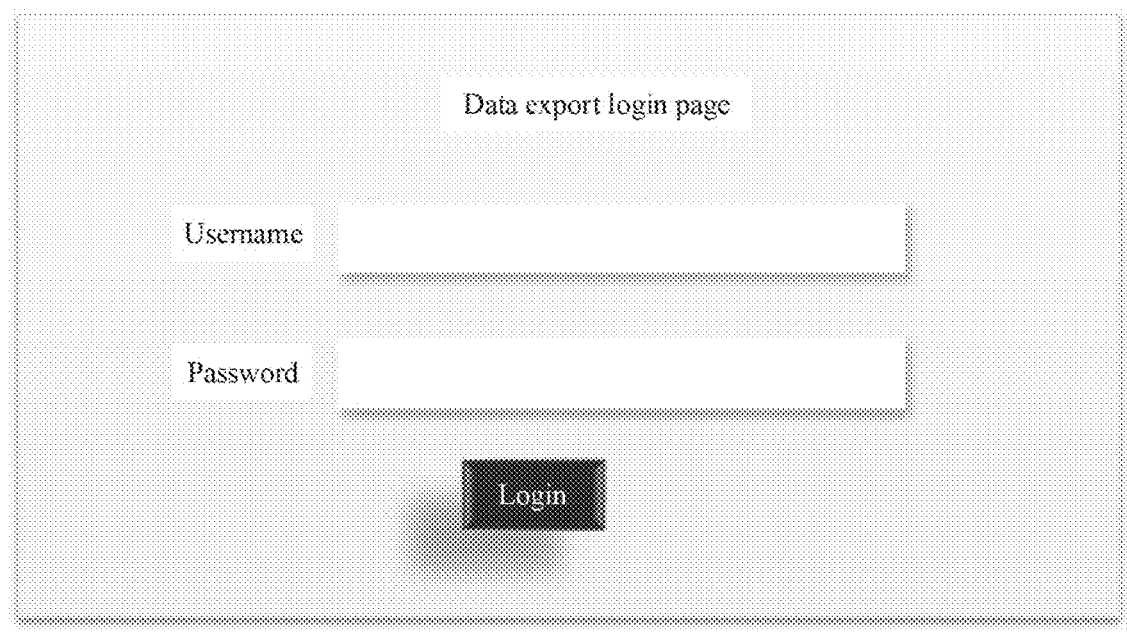
FIG. 2B is a schematic diagram of a login page according to an embodiment of this disclosure.

The target data is stored in the server. To improve security, permission may be set for the server. Only an authorized user can obtain the target data from the server. Therefore, before obtaining the target data from the server, the first terminal sends the login request to the server, to request to log in to the server, and after logging in to the server, performs an operation of obtaining the target data. The user account of the user may be a name, a mobile phone number, an ID card number, or the like of the user. A login page of the first terminal is shown in FIG. 2B.

Step 202: The server receives the login request of the first terminal, performs permission verification on the user based on the user account and the login password, and when the permission verification succeeds, allows the first terminal to log in to the server.

In a possible implementation, the server determines whether the user account matches the login password. When the user account matches the login password, the permission verification on the user by the server succeeds. If the user account does not match the login password, the permission verification on the user by the server fails.

In another possible implementation, the server may further set different permission for different users, and not all users registered with the server have permission to obtain the target data. Therefore, when determining that the user account matches the login password, the server determines, based on the user account, whether the user has the permission to obtain the data. If the user has the permission to obtain the data, the permission verification on the user succeeds. When the user account does not match the login password or the user does not have the permission to obtain the data, it is determined that the permission verification on the user fails.

The server stores a user account set having the permission to obtain the data. When the user account set includes the user account of the user, the server determines that the user has the permission to obtain the data; and when the user account set does not include the user account of the user, the server determines that the user does not have the permission to obtain the data.

When the permission verification on the user by the server succeeds, the server sends a login success prompt message to the first terminal. When the permission verification on the user by the server fails, the server sends a login failure prompt message to the first terminal, where the login failure prompt message carries a login failure cause.

In this embodiment of this disclosure, before obtaining the target data from the server, the first terminal logs in to the server by using an authentication credential (e.g., the user account and the login password), to ensure that only an authorized user can obtain the target data from the server, thereby improving security of the target data.

Step 203: The first terminal sends a data obtaining request to the server, where the data obtaining request is used to request to obtain the target data.

Figure 2C:
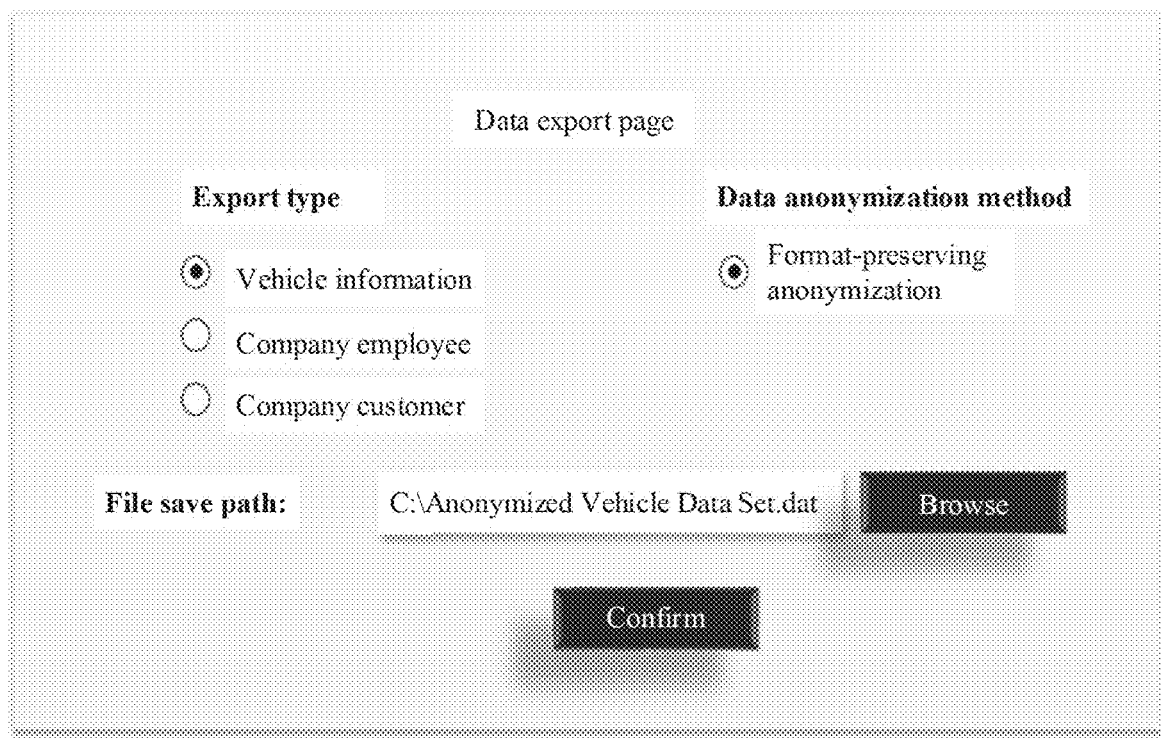
FIG. 2C is a schematic diagram of a data exporting page according to an embodiment of this disclosure.

When receiving the login success prompt message, the first terminal sends the data obtaining request to the server, where the data obtaining request includes a to-be-obtained information type, a to-be-obtained file name, and/or a to-be-obtained file storage path, and the like. The information type may be: vehicle information, a company employee, a company customer, or the like. The data obtaining request may further carry a data anonymization method. The data anonymization method may be format-preserving anonymization or non-format-preserving anonymization. A data exporting page is shown in FIG. 2C. The target data may be any data stored in the server. In addition, the target data may store at least one record. For example, the target data is personal data. The personal data may be any user-related data such as a name, a phone number, an ID card number, or a vehicle identification number.

Step 204: The server receives the data obtaining request of the first terminal, and obtains the requested target data based on the data obtaining request.

The data acquisition request carries the to-be-obtained information type, the to-be-obtained file name, and/or the to-be-obtained file storage path. The server obtains the target data of the information type in a folder with the to-be-obtained file name from a data storing module based on the information type and the to-be-obtained file name.

For example, the target data is a vehicle identification number of a vehicle. The target data includes a plurality of vehicle identification number records, as shown in the following Table 1:

TABLE 1

| Vehicle identification number |
| --- |
| FA123456 |
| HG789123 |
| RT546289 |
| PY478963 |
| OY456789 |
| . . . |

Step 205: The server determines behavior data generated when the target data is obtained.

The behavior data includes a user identifier of a user requesting to obtain the target data, a system time for obtaining the target data, and a system identifier of a system for obtaining the target data. In other words, the behavior data is used to indicate a person that obtains the target data and a time and a location for obtaining the target data.

In this embodiment of this disclosure, the server performs subsequent anonymization based on the behavior data, to subsequently facilitate restoration of the behavior data, thereby tracing and auditing a leaker.

Step 206: The server determines, based on the behavior data, a first permutation character sequence corresponding to the target data.

This step may be implemented by performing the following steps (1) to (4):

(1) The server determines at least one to-be-anonymized character string in the target data according to an anonymization rule of the target data.

Target data of different information types has different anonymization rules. For example, an anonymization rule of a vehicle identification number is: anonymizing the first two uppercase letters and the last two digits of the vehicle identification number. An anonymization rule of a name is: anonymizing the last name or the first name in the name. An anonymization rule of a mobile phone number is: anonymizing the last four digits of the mobile phone number. In addition, the server stores a correspondence between an information type and an anonymization rule. Therefore, before performing step (1), the server obtains the anonymization rule of the target data based on the correspondence between an information type and an anonymization rule based on the information type of the target data. Each character string includes at least one character.

For example, the target data is a vehicle identification number, and an anonymization rule of the vehicle identification number is: anonymizing the first two uppercase letters and the last two digits of the vehicle identification number. In this case, the server obtains the first two uppercase letters and the last two digits of each vehicle identification number record in the target data: FA56, HG23, RT89, PY63, and OY89.

(2) The server obtains, based on each character format of the at least one character string and a quantity of binary digits that can be embedded into a character in each character format, a second permutation character sequence corresponding to the character format.

In this embodiment of this disclosure, binary watermark information is embedded by using a character location in the second permutation character sequence. The second permutation character sequence corresponding to the character format has a size of $2^k$. The value k is an integer greater than or equal to 1, and k indicates a quantity of binary digits that can be embedded into each type of character. A larger value of k indicates that more information can be embedded. Accordingly, this step can be performed through the following steps (2-1) to (2-3):

(2-1) The server determines at least one character format in the at least one character string. For each character format, the server obtains, based on the character format, a third permutation character sequence corresponding to the character format, where the third permutation character sequence includes all characters in the character format.

The server stores a correspondence between the character format and the third permutation character sequence. Correspondingly, the step of obtaining, by the server based on the character format, the third permutation character sequence corresponding to the character format may be: obtaining, by the server based on the character format and based on the correspondence between the character format and the third permutation character sequence, the third permutation character sequence corresponding to the character format.

For example, if the at least one character string is FA56, HG23, RT89, PY63, and OY89, the at least one character format of the at least one character string is a letter format and a digit format. When the character format is an English letter, the third permutation character sequence corresponding to the English letter is {A B C D E F G H I J K L M N O P Q R S T U V W X Y Z}. When the character format is a number, the third permutation character sequence corresponding to the number is {0 1 2 3 4 5 6 7 8 9}.

(2-2) The server converts, into a decimal number, a quantity of binary digits that can be embedded into the character in the character format.

The server stores a correspondence between each character format and a quantity of embeddable binary digits. Correspondingly, this step may be: The server obtains, based on the character format and based on the correspondence between a character format and a quantity of binary digits, a quantity of binary digits that can be embedded into the character in the character format, and converts the quantity of binary digits into a decimal number.

For example, if a quantity of binary digits that can be embedded into an English letter is 4, the server converts 4 into a decimal number 16. For another example, if a quantity of binary digits that can be embedded into a number is 3, the server converts 3 into a decimal number 8.

(2-3) The server obtains the decimal number of characters from the third permutation character sequence to form the second permutation character sequence corresponding to the character format.

In a possible implementation, the server directly obtains the decimal number of characters from the third permutation character sequence. A specific manner is as follows:

(1) The server randomly obtains the decimal number of characters from the third permutation character sequence to form the second permutation character sequence corresponding to the character format.

For example, if the third permutation character sequence corresponding to the letter is {A B C D E F G H I J K L M N O P Q R S T U V W X Y Z}, and the decimal number corresponding to the letter is 16, the server randomly selects 16 characters from the third permutation character sequence corresponding to the letter, to form the second permutation character sequence {A B C D E F G H I J K L M N O P} corresponding to the letter. If the third permutation character sequence corresponding to the number is {0 1 2 3 4 5 6 7 8 9}, and the binary number corresponding to the number is 8, the server selects 8 characters from the third permutation character sequence corresponding to the number, to form the second permutation character sequence {1 3 5 7 9 2 4 6} corresponding to the number.

(2) The server selects the first decimal number of characters from the third permutation character sequence to form the second permutation character sequence corresponding to the character format.

(3) The server selects the last decimal number of characters from the third permutation character sequence to form the second permutation character sequence corresponding to the character format.

In another possible implementation, the server may further obtain characters from the third permutation character sequence, and then perform encryption scrambling, thereby further improving security. Correspondingly, step (2-3) may further be: the server obtains the decimal number of characters from the third permutation character sequence to form a fourth permutation character sequence, and performs encryption scrambling on the fourth permutation character sequence based on the second encryption key, to obtain the second permutation character sequence corresponding to the character format.

It should be noted that a process in which the server obtains the decimal number of characters from the third permutation character sequence to form the fourth permutation character sequence is the same as a process in which the server obtains the decimal number of characters from the third permutation character sequence to form the second permutation character sequence. Details are not described herein again. In addition, in this embodiment of this disclosure, encryption scrambling is performed on the fourth permutation character sequence based on the second encryption key, thereby further improving security.

(3) The server converts the behavior data into a watermark ciphertext sequence.

The watermark ciphertext sequence may be a binary sequence, or may be a decimal sequence. When the watermark ciphertext sequence is a binary sequence, the server converts the behavior data into binary data, to obtain the watermark ciphertext sequence. When the watermark ciphertext sequence is a binary sequence, this step may be performed through the following steps (3-1) to (3-3):

(3-1) The server converts the behavior data into binary data to obtain a binary sequence.

In a possible implementation, the server may directly convert the behavior data into binary data, and form the binary sequence by using the binary data. In another possible implementation, the server may further encrypt the behavior data to convert the behavior data, to improve security. Correspondingly, this step may be as follows:

obtaining, by the server, a first encryption key, and encrypting the behavior data based on the first encryption key, to obtain the binary sequence.

The server includes a key management module, and the key management module is configured to generate and manage a key. The server obtains the first encryption key from the key management module. For example, the server encrypts the behavior data based on the first encryption key, to obtain the binary sequence WMCT= {0011010111010110111010000001011100011000101011011011}$_2$.

In this embodiment of this disclosure, before character permutation, the server encrypts the behavior data based on the first encryption key, so that no one can forge the behavior data or illegally obtain the behavior data without knowing the first encryption key. In this way, the behavior data is prevented from being maliciously forged, counterfeited, or even illegally obtained, thereby improving security.

(3-2) The server groups the binary sequence based on a quantity of binary digits that can be embedded into each type of character in each character string, to obtain a plurality of groups.

For example, two uppercase letters and two digit characters need to be anonymized sequentially for each vehicle identification number record. Therefore, four-bit, four-bit, three-bit, and three-bit binary information may be embedded into each vehicle identification number record sequentially. Therefore, the binary sequence WMCT is grouped based on a group size {4, 4, 3, 3}, to obtain a plurality of groups {0011 0101 110 101 1011 1010 000 001 0111 0001 100 010 1001 1010 111 011}$_2$.

(3-3) The server converts a binary number in each group into a decimal number to obtain the watermark ciphertext sequence.

The server converts a binary number in each group into a decimal number, and forms the watermark ciphertext sequence by using a plurality of obtained decimal numbers.

For example, the plurality of groups {0011 0101 110 101 1011 1010 000 001 0111 0001 100 010 1001 1010 111 011}$_2$ are respectively converted into decimal numbers, to obtain the watermark ciphertext sequence {3 5 6 5 11 10 0 1 7 7 4 2 9 10 7 3}$_{10}$.

(4) For any character in the watermark ciphertext sequence, the server obtains a permutation character that is in the second permutation character sequence corresponding to a character format of the character and that has location information indicating the character, and replaces the character with the permutation character to obtain the first permutation character sequence.

For example, the watermark ciphertext sequence is {3 5 6 5 11 10 0 1 7 7 4 2 9 10 7 3}, and the second permutation character sequence corresponding to the letter character and the second permutation character sequence corresponding to the digit character are shown in the following Table 2:

TABLE 2

| | Second permutation character sequence in a letter format | Second permutation character sequence in a number format |
|---|---|---|
| Char Set | {A B C D E F G H I J K L M N O P} | {1 3 5 7 9 2 4 6} |
| location | {0 1 2 3 4 5 6 7 8 9 10 11 12 13 14 15} | {0 1 2 3 4 5 6 7} |

The server permutes the {3 5 6 5 11 10 0 1 7 7 4 2 9 10 7 3} based on the second permutation character sequence of the letter characters and the second permutation character sequence of the number characters, to obtain the first permutation character sequence {D F 4 2 L K 1 3 H H 9 5 J K 6 7}.

Step 207: The server anonymizes a to-be-anonymized character string in the target data based on the first permutation character sequence.

This step may be implemented by performing the following steps (1) to (3):

(1) The server obtains a preset permutation rule.

The preset rule may be set and modified as required, and the preset rule is not specifically limited in this embodiment of this disclosure. For example, the preset permutation rule may be sequential permutation or permutation based on location information.

(2) The server anonymizes, according to the preset permutation rule and the first permutation character sequence, the to-be-anonymized character string in the target data, to obtain an anonymized character string.

When the preset permutation rule is sequential permutation, this step may be: sequentially replacing, by the server, the to-be-anonymized character string with characters in the first permutation character sequence, to obtain the anonymized character string.

For example, to-be-anonymized character strings are separately FA56, HG23, RT89, PY63, and OY89, and the first permutation character sequence is {D F 4 2 L K 1 3 H H 9 5 J K 6 7}. In this case, the server replaces FA56, HG23, RT89, PY63, and OY89 with DF42, LK13, HH95, JK67, and DF42, respectively.

In this embodiment of this disclosure, the server generates the first permutation character sequence based on the behavior data, and then sequentially selects characters from the first permutation character sequence to replace characters that need to be anonymized. In this way, the behavior data is embedded in an anonymization process, thereby improving security and providing opportunities for subsequent tracing and auditing. In addition, the server does not need to store the behavior data with extra storage space in the anonymization process, thereby saving storage space.

In a possible implementation, when sequentially replacing the to-be-anonymized character string with the characters in the first permutation character sequence, the server may further perform encryption scrambling on the permuted character string, thereby further improving security. Correspondingly, step (2) may further be: sequentially replacing, by the server, the characters in the at least one to-be-anonymized character string with the characters in the first permutation character sequence, to obtain the permuted target data; and encrypting characters in the permuted target data based on the third encryption key and a preset format-preserving encryption algorithm, to obtain the anonymized target data.

The preset format-preserving encryption algorithm may be set and modified as required. The preset format-preserving encryption algorithm is not specifically limited in this embodiment of this disclosure. For example, the preset format-preserving encryption algorithm may be encryption scrambling. Correspondingly, the step of encrypting, by the server, characters in the permuted target data based on the third encryption key and a preset format-preserving encryption algorithm, to obtain the anonymized target data may be: performing, by the server, encryption scrambling on the characters in the permuted target data based on the third encryption key, to obtain the anonymized target data.

For example, the permuted target data is DF123442, LK789113, HH546295, JK478967, and DF456742. The server performs encryption scrambling on the characters in the permuted target data based on the third encryption key, to obtain the anonymized target data: FD442123, KL113789, HH295546, KJ967478, and FD742456.

In this embodiment of this disclosure, after permutating the to-be-anonymized character string, the server performs encryption scrambling on the permuted character string again, and no one can restore the user data without knowing the third encryption key, thereby further improving security. In addition, the present solution can implement format-preserving anonymization.

(3) The server replaces the to-be-anonymized character string in the target data with the anonymized character string, to obtain the anonymized target data.

For example, when sequentially replacing only the characters in the to-be-anonymized character string in the target data with the characters in the first permutation character sequence, the server replaces FA56, HG23, RT89, PY63, and OY89 in the target data with DF42, LK13, HH95, JK67, and DF42, respectively, to obtain the anonymized target data, as shown in the following Table 3.

TABLE 3

| Vehicle identification number |
|---|
| DF123442 |
| LK789113 |
| HH546295 |
| JK478967 |
| DF456742 |
| . . . |

For another example, after sequentially replacing the characters in the to-be-anonymized character string in the target data with the characters in the first permutation character sequence, the server performs encryption scrambling on the permuted target data based on the third encryption key, to obtain the anonymized target data. The anonymized target data is shown in the following Table 4:

TABLE 4

| Vehicle identification number |
|---|
| FD442123 |
| KL113789 |
| HH295546 |
| KJ967478 |
| FD742456 |
| . . . |

Step 208: The server outputs the anonymized target data.

The server outputs the anonymized target data to the first terminal.

Step 209: The first terminal receives the anonymized target data of the server.

The data obtaining request carries a to-be-obtained file storage path. Correspondingly, after receiving the anonymized target data of the server, the first terminal stores, according to the to-be-obtained file storage path, the anonymized target data in storage space corresponding to the to-be-obtained file storage path.

In this embodiment of this disclosure, the first permutation character sequence is determined based on the behavior data generated when the target data is obtained, and anonymization is performed based on the first permutation character sequence. Because the behavior data is different each time and is not easy to crack, the anonymization is implemented without relying on plaintext information, thereby improving anonymization security and meeting anonymization requirements of laws.

Figure 3:
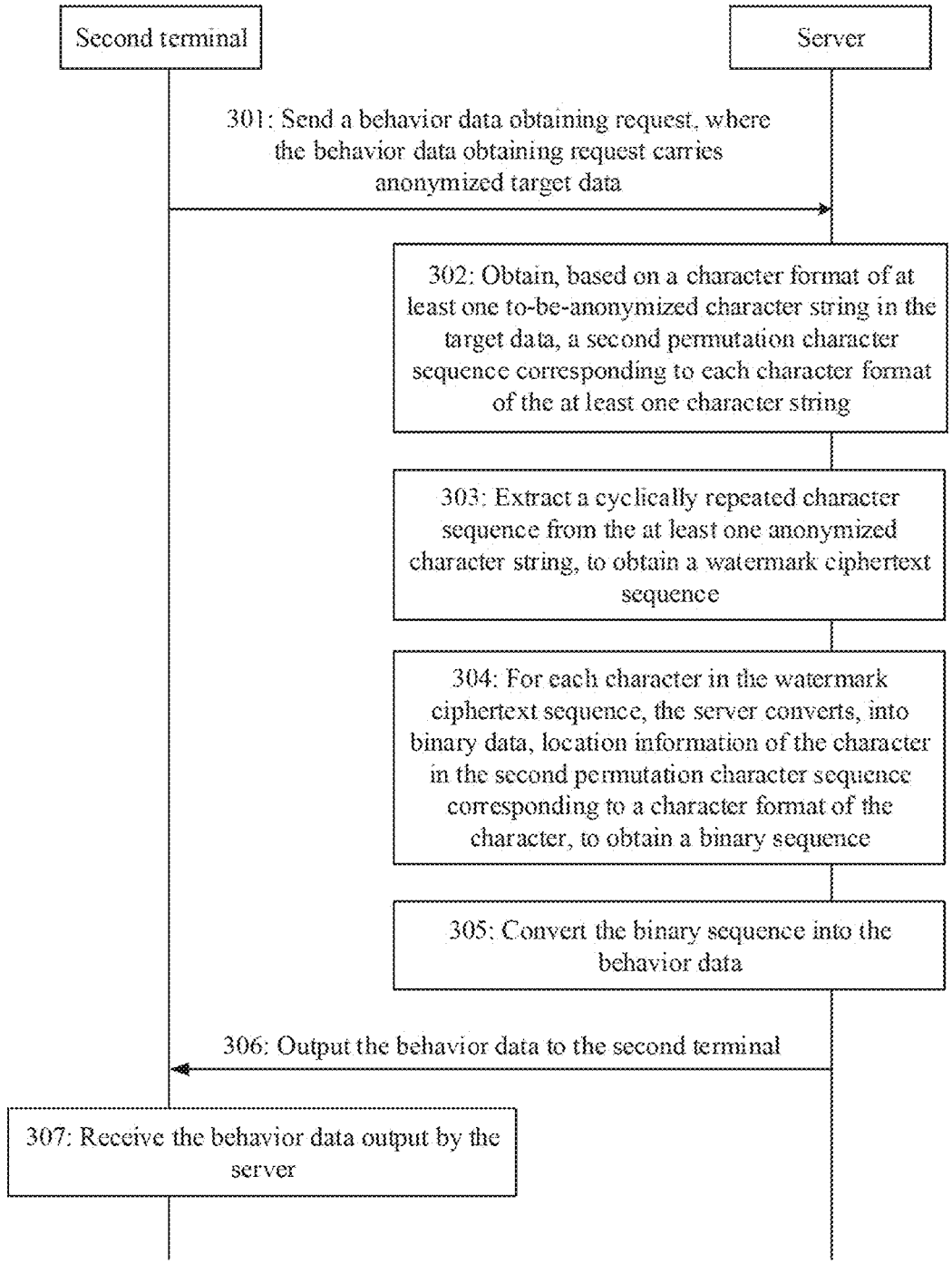
FIG. 3 is a flowchart of an anonymization method according to an embodiment of this disclosure.

In this embodiment of this disclosure, because the first permutation character sequence is generated based on the behavior data generated when the target data is obtained, the behavior data may be extracted based on the anonymized target data, to help an auditor trace and audit a leakage behavior. The method is applied to a second terminal and a server. Referring to FIG. 3, the method includes the following steps.

Step 301: The second terminal sends a behavior data obtaining request to the server, where the behavior data obtaining request carries anonymized target data.

When the target data is leaked, the second terminal may trace and audit a leaker. In this case, the second terminal sends the anonymized target data to the server, so that the server determines the behavior data from the anonymized target data, to determine the leaker.

It should be noted that, before the second terminal sends the behavior data obtaining request to the server, the second terminal also needs to log in to the server first, and only an authorized user can trace and audit the leaker. Therefore, before this step, the second terminal sends a login request to the server, where the login request carries a user account and a login password of the second terminal. The server receives the login request of the second terminal, and performs permission verification on the user based on the user account and the login password. When the permission verification succeeds, the second terminal is allowed to log in to the server, and then the second terminal sends the behavior data obtaining request to the server.

It should be noted that a process in which the server attempts to verify the user of the second terminal is similar to a process in which the server attempts to verify the user of the first terminal, and details are not described herein again.

Step 302: The server receives the behavior data obtaining request of the second terminal, and obtains, based on a character format of at least one to-be-anonymized character string in the target data, a second permutation character sequence corresponding to each character format of the at least one character string.

After anonymizing the target data, the server stores a correspondence between each character format and the second permutation character sequence. Correspondingly, this step may be: obtaining, by the server according to an anonymization rule of the target data, the at least one anonymized character string from the anonymized target data; determining, by the server, at least one character format of each character string; and obtaining, based on each character format and the correspondence between a character format and the second permutation character sequence, the second permutation character sequence corresponding to each character format.

For example, the server stores the second permutation character sequence in a letter format as {A B C D E F G H I J K L M N O P}, and stores the second permutation character sequence in a digit format as {1 3 5 7 9 2 4 6}. The anonymized target data is DF123442, LK789113, HH546295, JK478967, and DF456742. The server obtains anonymized character strings from the anonymized target data based on the anonymization rule as follows: DF42, LK13, HH95, JK67, and DF42. The server determines that the at least one character format is the letter format and the digit format, and obtains second permutation character sequences respectively corresponding to the letter format and the digit format as follows: {A B C D E F G H I J K L M N O P} and {1 3 5 7 9 2 4 6}.

In another possible implementation, when the server anonymizes the target data, if encryption scrambling is performed on characters in the second permutation character sequence, this step may be:

obtaining, by the server based on the character format of the at least one to-be-anonymized character string in the target data, a fourth permutation character sequence corresponding to each character format of the at least one character string; obtaining a second encryption key; and decrypting, based on the second encryption key, the fourth permutation character sequence corresponding to each character format, to obtain the second permutation character sequence corresponding to each character format.

Step 303: The server extracts a cyclically repeated character sequence from the at least one anonymized character string, to obtain a watermark ciphertext sequence.

In a possible implementation, during anonymization of the target data, when the server replaces only a character in the watermark ciphertext sequence with a character in the first permutation character sequence, in this step, the server may directly extract the cyclically repeated character sequence from the at least one anonymized character string, to obtain the watermark ciphertext sequence.

For example, if the at least one anonymized character string is DF42, LK13, HH95, JK67, and DF42, the server obtains the watermark ciphertext sequence {D F 4 2 L K 1 3 H H 9 5 J K 6 7 D F 4 2}.

In another possible implementation, during anonymization of the target data, when the server further performs encryption scrambling on the permuted character based on the third encryption key after replacing the character in the watermark ciphertext sequence with the character in the first permutation character sequence, this step may be as follows: The server obtains a third encryption key, decrypts the anonymized target data based on the third encryption key and a preset format-preserving encryption algorithm, to obtain the permuted target data, and extracts the cyclically repeated character sequence from the permuted target data, to obtain the watermark ciphertext sequence.

The preset format-preserving encryption algorithm may be set and modified as required. In this embodiment of this disclosure, the preset format-preserving encryption algorithm may be encryption scrambling. Correspondingly, the step of decrypting, by the server, the anonymized target data based on the third encryption key and the preset format-preserving encryption algorithm, to obtain the permuted target data may be: performing, by the server, inverse scrambling on characters in the anonymized target data based on the third encryption key, to obtain the permuted target data.

For example, the anonymized target data is FD442123, KL113789, HH295546, KJ967478, and FD742456, and the server performs inverse scrambling on the characters in the anonymized target data based on the third encryption key, to obtain the permuted target data: DF123442, LK789113, HH546295, JK478967, and DF456742. The server extracts the cyclically repeated character sequence from the permuted target data, to obtain the watermark ciphertext sequence {D F 4 2 L K 1 3 H H 9 5 J K 6 7 D F 4 2}.

Step 304: For each character in the watermark ciphertext sequence, the server converts, into binary data, location information of the character in the second permutation character sequence corresponding to a character format of the character, to obtain a binary sequence.

For each character in the watermark ciphertext sequence, the server obtains the location information of the character in the second permutation character sequence corresponding to the character format, converts the location information into binary data, and forms the binary sequence by using binary data corresponding to each character in the watermark ciphertext sequence.

For example, the second permutation character sequences corresponding to the letter format and the digit format are respectively {A B C D E F G H I J K L M N O P} and {1 3 5 7 9 2 4 6}, and the watermark ciphertext sequence is {D F 4 2 L K 1 3 H H 9 5 J K 6 7 D F 4 2}. The server obtains the location information of each character in the watermark ciphertext sequence as follows: 3 5 6 5 11 10 0 1 7 7 4 2 9 10 7 3. The server converts the location information of each character into a binary number, to obtain the binary sequence {0011 0101 110 101 1011 1010 000 001 0111 0001 100 010 1001 1010 111 011}.

Step 305: The server converts the binary sequence into the behavior data.

During anonymization of the target data, when the server does not perform encryption scrambling on the behavior data, this step may be: directly converting the binary sequence into the behavior data. During anonymization of the target data, when the server performs encryption scrambling on the behavior data to obtain the binary sequence, this step may be: obtaining, by the server, a first encryption key; and decrypting the binary sequence based on the first encryption key, to obtain the behavior data. The behavior data includes a user identifier of a user obtaining the target data, a system time for obtaining the target data, and a system identifier of a system for obtaining the target data.

Step 306: The server outputs the behavior data to the second terminal.

Step 307: The second terminal receives the behavior data outputted by the server.

The behavior data includes the user identifier of the user requesting to obtain the target data, the system time for obtaining the target data, and the system identifier of the system for obtaining the target data. In other words, the behavior data is used to indicate a person that obtains the target data and a time and a location for obtaining the target data. Therefore, a leaker can be determined based on the behavior data, to help an auditor trace and audit a leak behavior of the user.

Figure 4A:
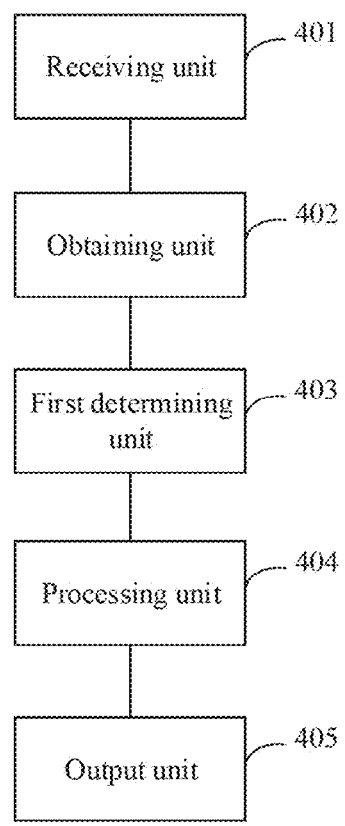
FIG. 4A is a schematic structural diagram of an anonymization apparatus according to an embodiment of this disclosure.

An embodiment of this disclosure provides an anonymization apparatus. Referring to FIG. 4A, the apparatus includes:

a receiving unit 401, configured to receive a data obtaining request of a first terminal;

an obtaining unit 402, configured to obtain requested target data based on the data obtaining request;

a first determining unit 403, configured to determine behavior data generated when the target data is obtained, where the first determining unit 403 is further configured to determine, based on the behavior data, a first permutation character sequence corresponding to the target data;

a processing unit 404, configured to anonymize a to-be-anonymized character string in the target data based on the first permutation character sequence; and an output unit 405, configured to output the anonymized target data.

In a possible implementation, the behavior data includes a user identifier of a user requesting to obtain the target data, a system time for obtaining the target data, and a system identifier of a system for obtaining the target data.

Figure 4B:
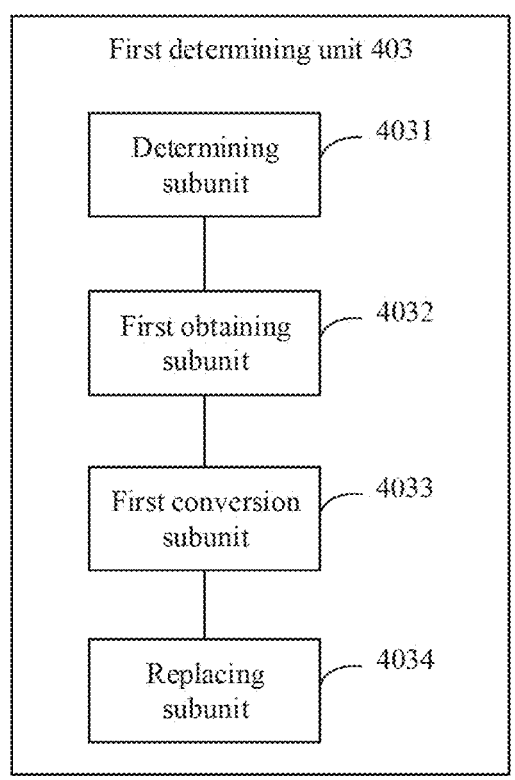
FIG. 4B is a schematic structural diagram of a first determining unit according to an embodiment of this disclosure.

In another possible implementation, referring to FIG. 4B, the first determining unit 403 includes:

a determining subunit 4031, configured to determine at least one to-be-anonymized character string in the target data according to an anonymization rule of the target data;

a first obtaining subunit 4032, configured to obtain, based on each character format of the at least one character string and a quantity of binary digits that can be embedded into a character in each character format, a second permutation character sequence corresponding to the character format;

a first conversion subunit 4033, configured to convert the behavior data into a watermark ciphertext sequence; and a replacing subunit 4034, configured to: for any character in the watermark ciphertext sequence, obtain a permutation character that is in the second permutation character sequence corresponding to a character format of the character and that has location information indicating the character, and replace the character with the permutation character to obtain the first permutation character sequence.

In another possible implementation, the first conversion subunit 4033 is further configured to: convert the behavior data into binary data to obtain a binary sequence; group the binary sequence based on a quantity of binary digits that can be embedded into each type of character in each character string, to obtain a plurality of groups; and convert a binary number in each group into a decimal number to obtain the watermark ciphertext sequence.

In another possible implementation, the first conversion subunit 4033 is further configured to: obtain a first encryption key; and encrypt the behavior data based on the first encryption key, to obtain the binary sequence.

In another possible implementation, the replacing subunit 4034 is further configured to: for each character format, obtain, based on the character format, a third permutation character sequence corresponding to the character format, where the third permutation character sequence includes all characters in the character format; and convert, into a decimal number, a quantity of binary digits that can be embedded into the character in the character format, and obtain the decimal number of characters from the third permutation character sequence to form the second permutation character sequence corresponding to the character format.

In another possible implementation, the replacing subunit 4034 is further configured to: obtain the decimal number of characters from the third permutation character sequence to form a fourth permutation character sequence; and perform encryption scrambling on the fourth permutation character sequence based on a second encryption key, to obtain the second permutation character sequence corresponding to the character format.

In another possible implementation, the processing unit 404 is further configured to sequentially replace characters in the to-be-anonymized character string in the target data with characters in the first permutation character sequence, to obtain an anonymized character string.

In another possible implementation, the processing unit 404 is further configured to: sequentially replace characters in at least one to-be-anonymized character string in the target data with characters in the first permutation character sequence, to obtain the permuted target data; and encrypt characters in the permuted target data based on a third encryption key and a preset format-preserving encryption algorithm, to obtain the anonymized target data.

Figure 4C:
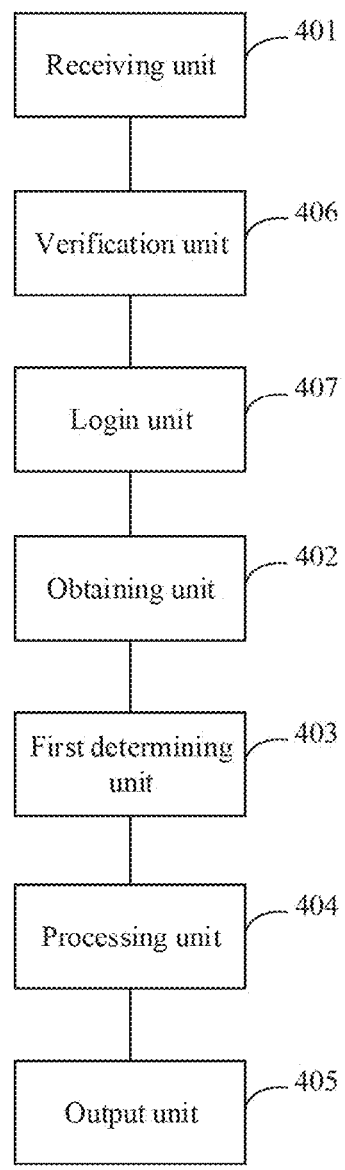
FIG. 4C is a schematic structural diagram of an anonymization apparatus according to an embodiment of this disclosure.

In another possible implementation, referring to FIG. 4C, the apparatus further includes:

the receiving unit 401, further configured to receive a login request of the first terminal, where the login request carries a user account and a login password of a user;

a verification unit 406, configured to perform permission verification on the user based on the user account and the login password; and a login unit 407, configured to: when the permission verification succeeds, allow the first terminal to perform a login operation.

Figure 4D:
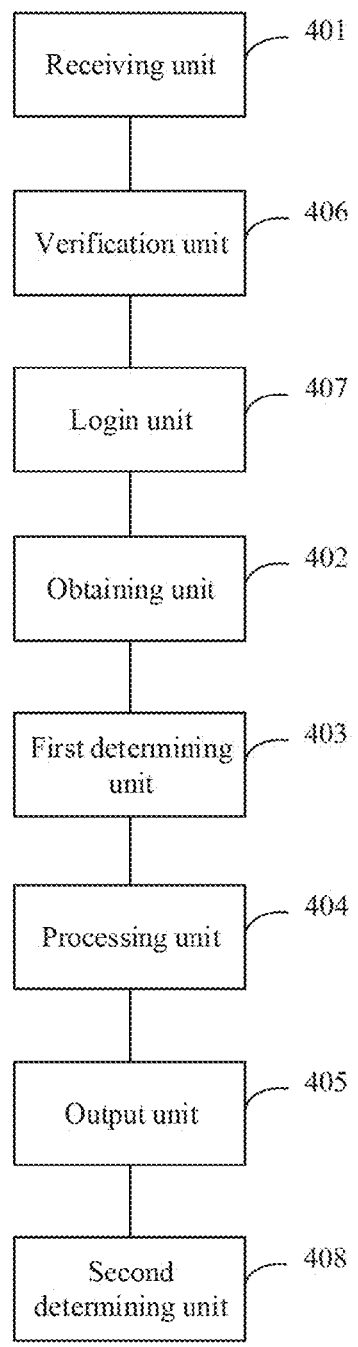
FIG. 4D is a schematic structural diagram of an anonymization apparatus according to an embodiment of this disclosure.

In another possible implementation, referring to FIG. 4D, the apparatus further includes:

the receiving unit 401 is further configured to receive a behavior data obtaining request of a second terminal, where the behavior data obtaining request carries the anonymized target data; and a second determining unit 408, configured to determine, based on the anonymized target data, the behavior data generated when the target data is obtained.

Figure 4E:
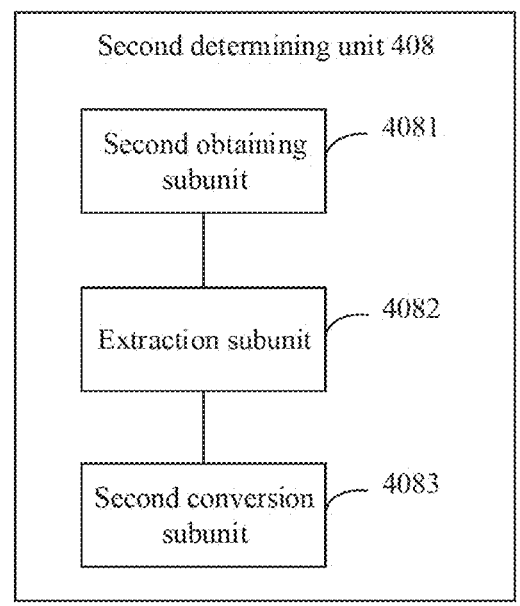
FIG. 4E is a schematic structural diagram of a second determining unit according to an embodiment of this disclosure.

In another possible implementation, referring to FIG. 4E, the second determining unit 408 includes:

a second obtaining subunit 4081, configured to obtain, based on a character format of the at least one to-be-anonymized character string in the anonymized target data, the second permutation character sequence corresponding to each character format of the at least one character string;

an extraction subunit 4082, configured to extract a cyclically repeated character sequence from the anonymized target data, to obtain the watermark ciphertext sequence;

a second conversion subunit 4083, configured to: for each character in the watermark ciphertext sequence, convert, into a binary number, location information of the character in the second permutation character sequence corresponding to a character format of the character, to obtain the binary sequence; and the second conversion subunit 4083 is further configured to convert the binary sequence into the behavior data.

In another possible implementation, the second conversion subunit 4083 is further configured to: obtain a first encryption key; and decrypt the binary sequence based on the first encryption key, to obtain the behavior data.

In another possible implementation, the second obtaining subunit 4081 is further configured to: obtain, based on a character format of the at least one to-be-anonymized character string in the target data, a fourth permutation character sequence corresponding to each character format of the at least one character string; obtain a second encryption key; and decrypt, based on the second encryption key, the fourth permutation character sequence corresponding to each character format, to obtain the second permutation character sequence corresponding to the character format.

In another possible implementation, the extraction subunit 4082 is further configured to: obtain a third encryption key; decrypt the anonymized target data based on the third encryption key and a preset format-preserving encryption algorithm, to obtain the permuted target data; and extract the cyclically repeated character sequence from the permuted target data, to obtain the watermark ciphertext sequence.

In an embodiment of this disclosure, the first permutation character sequence is determined based on the behavior data generated when the target data is obtained, and anonymization is performed based on the first permutation character sequence. Because the behavior data is different each time and is not easy to crack, anonymization is implemented without relying on plaintext information, thereby improving anonymization security and meeting anonymization requirements specified by laws.

It should be noted that when the anonymization apparatus provided in the foregoing embodiments performs anonymization, division into the foregoing functional modules is merely an example for description. In actual application, the functions may be implemented by different functional modules as required. To be specific, an internal structure of a device is divided into different functional modules to implement all or some of the functions described above. In addition, the anonymization apparatus and the anonymization method embodiments that are provided in the foregoing embodiments belong to a same concept. For a specific implementation process, refer to the method embodiments, and details are not described herein.

Figure 5:
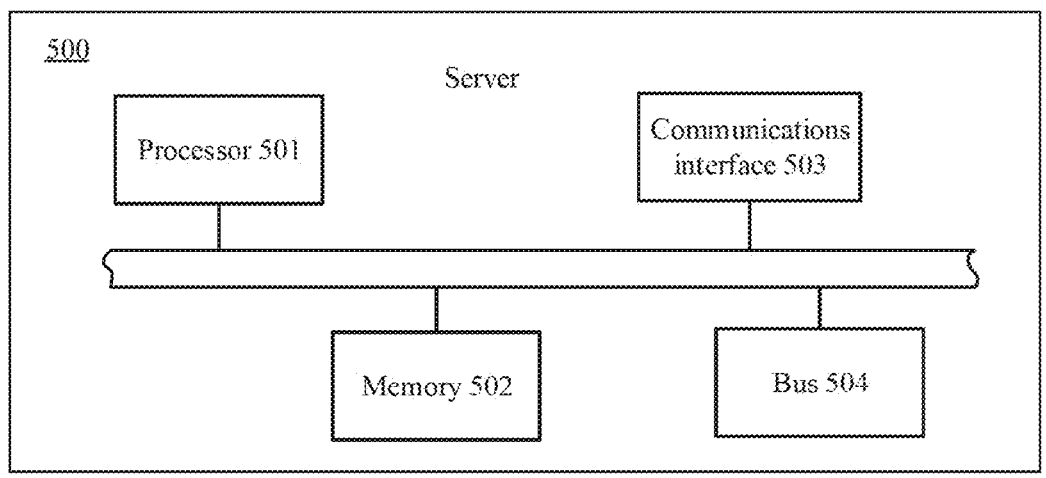
FIG. 5 is a schematic structural diagram of a server according to an embodiment of this disclosure.

FIG. 5 is a block diagram of an anonymization apparatus 500 according to an example of an embodiment. For example, the apparatus 500 may be provided as a server. Referring to FIG. 5, the apparatus 500 may vary greatly due to different configurations or performance, and may include one or more processors (e.g., central processing units, CPU) 501, one or more memories 502, a communications interface 503, and a bus 504.

The memory 502, the processor 501, and the communications interface 503 are connected by using the bus 504. The memory 502 stores a programmable instruction. The programmable instruction is loaded and executed by the processor 501 to implement the anonymization method provided in this embodiment of this disclosure. The communications interface 503 may communicate with another device.

Certainly, the apparatus 500 may further include components such as a wired or wireless network interface and an input/output interface, to perform input/output. The apparatus 500 may further include another component configured to implement a device function. Details are not described herein.

An embodiment of this disclosure provides a computer-readable storage medium. The storage medium includes an instruction, and when the instruction is run on a computer, the computer is enabled to perform the foregoing anonymization method.

An embodiment of this disclosure also provides a computer program product. The computer program product includes one or more instructions, and when the instruction is loaded and executed on a server, the anonymization method described in the embodiments of this disclosure can be implemented. The server may be a general-purpose computer, a dedicated computer, a computer network, or other programmable apparatuses. The instruction may be stored in a computer-readable storage medium or may be transmitted from a computer-readable storage medium to another computer-readable storage medium. For example, the instruction may be transmitted from a website, computer, server, or data center to another website, computer, server, or data center in a wired or wireless manner. The computer-readable storage medium may be any usable medium accessible by a computer, or a data storage device, such as a server or a data center, integrating one or more usable media. The usable medium may be a magnetic medium (e.g., a floppy disk, a hard disk, or a magnetic tape), an optical medium (e.g., a digital video disc (DVD)), a semiconductor medium (e.g., a solid-state drive, SSD), or the like.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely optional embodiments of this disclosure, but are not intended to limit this disclosure. Any modification, equivalent replacement, or improvement made without departing from the spirit and principle of this disclosure should fall within the protection scope of this disclosure.

What is claimed is:

1. An anonymization method, wherein the method comprises:
   receiving a data obtaining request of a first terminal, and obtaining target data based on the data obtaining request;
   determining behavior data generated when the target data is obtained;
   determining, based on the behavior data, a first permutation character sequence corresponding to the target data by:
      determining at least one character string in the target data according to an anonymization rule of the target data,
      obtaining, based on each character format of the at least one character string and a quantity of binary digits that can be embedded into a character in each character format, a second permutation character sequence corresponding to the character format;
      converting the behavior data into a watermark ciphertext sequence; and
      for any character in the watermark ciphertext sequence, obtaining a permutation character that is in the second permutation character sequence corresponding to the character format of the character and that has location information indicating the character, and replacing the character with the permutation character to obtain the first permutation character sequence; and
   anonymizing, based on the first permutation character sequence, a character string in the target data to generate anonymized target data, and outputting the anonymized target data.

2. The method according to claim 1, wherein the behavior data comprises a user identifier of a user requesting to obtain the target data, a system time for obtaining the target data, and a system identifier of a system for obtaining the target data.

3. The method according to claim 1, wherein the converting the behavior data into the watermark ciphertext sequence comprises:
   converting the behavior data into binary data to obtain a binary sequence;
   grouping the binary sequence based on a quantity of binary digits that can be embedded into each type of character in each character string, to obtain a plurality of groups; and
   converting a binary number in each group into a decimal number to obtain the watermark ciphertext sequence.

4. The method according to claim 3, wherein the converting the behavior data into binary data to obtain the binary sequence comprises:
   obtaining a first encryption key; and
   encrypting the behavior data based on the first encryption key to obtain the binary sequence.

5. The method according to claim 1, wherein the anonymizing the character string in the target data based on the first permutation character sequence comprises:
   sequentially replacing characters in the character string in the target data with characters in the first permutation character sequence, to obtain an anonymized character string.

6. The method according to claim 1, wherein the anonymizing the character string in the target data based on the first permutation character sequence comprises:

sequentially replacing characters in at least one character string in the target data with characters in the first permutation character sequence, to obtain permuted target data; and encrypting characters in the permuted target data based on a third encryption key and a preset format-preserving encryption algorithm, to obtain the anonymized target data.

7. The method according to claim 1, wherein before the receiving the data obtaining request, the method further comprises:

receiving a login request of the first terminal, wherein the login request carries a user account and a login password of a user;

performing permission verification on the user based on the user account and the login password; and when the permission verification succeeds, allowing the first terminal to perform a login operation.

8. The method according to claim 1, wherein the method further comprises:

receiving a behavior data obtaining request of a second terminal, wherein the behavior data obtaining request of the second terminal carries the anonymized target data; and determining, based on the anonymized target data, the behavior data generated when the target data is obtained.

9. The method according to claim 8, wherein the determining, based on the anonymized target data, the behavior data generated when the target data is obtained comprises:

obtaining, based on a character format of at least one anonymized character string in the anonymized target data, the second permutation character sequence corresponding to each character format of the at least one character string;

extracting a cyclically repeated character sequence from the anonymized target data, to obtain the watermark ciphertext sequence;

for each character in the watermark ciphertext sequence, converting, into a binary number, location information of the character in the second permutation character sequence corresponding to a character format of the character, to obtain a binary sequence; and converting the binary sequence into the behavior data.

10. The method according to claim 9, wherein the converting the binary sequence into the behavior data comprises:

obtaining a first encryption key; and decrypting the binary sequence based on the first encryption key to obtain the behavior data.

11. The method according to claim 9, wherein the extracting the cyclically repeated character sequence from the anonymized target data, to obtain the watermark ciphertext sequence comprises:

obtaining a third encryption key;

decrypting the anonymized target data based on the third encryption key and a preset format-preserving encryption algorithm, to obtain permuted target data; and extracting the cyclically repeated character sequence from the permuted target data, to obtain the watermark ciphertext sequence.

12. A device, wherein the device comprises: a processor, a memory, a communications interface, and a bus, wherein the memory, the processor, and the communications interface are connected through the bus, the memory stores at least one programmable instruction, and the processor invokes the at least one programmable instruction stored in the memory, to configure the device to:

receive a data obtaining request of a first terminal, and obtain target data based on the data obtaining request;

determine behavior data generated when the target data is obtained;

determine, based on the behavior data, a first permutation character sequence corresponding to the target data;

determine at least one character string in the target data according to an anonymization rule of the target data;

obtain, based on each character format of the at least one character string and a quantity of binary digits that can be embedded into a character in each character format, a second permutation character sequence corresponding to the character format;

convert the behavior data into a watermark ciphertext sequence; and obtain, for any character in the watermark ciphertext sequence, a permutation character that is included in the second permutation character sequence corresponding to a character format of the character and that has location information indicating the character, and replace the character with the permutation character to obtain the first permutation character sequence; and anonymize, based on the first permutation character sequence, a character string in the target data to generate anonymized target data, and outputting the anonymized target data.

13. The device according to claim 12, wherein the processor invokes the at least one programmable instruction stored in the memory to further configure the device to:

convert the behavior data into binary data to obtain a binary sequence;

group the binary sequence based on a quantity of binary digits that can be embedded into each type of character in each character string, to obtain a plurality of groups; and convert a binary number in each group into a decimal number to obtain the watermark ciphertext sequence.

14. The device according to claim 13, wherein the processor invokes the at least one programmable instruction stored in the memory to further configure the device to:

obtain a first encryption key; and encrypt the behavior data based on the first encryption key to obtain the binary sequence.

15. The device according to claim 12, wherein the processor invokes the at least one programmable instruction stored in the memory to further configure the device to:

sequentially replace characters in the character string in the target data with characters in the first permutation character sequence, to obtain an anonymized character string.

16. The device according to claim 12, wherein the processor invokes the at least one programmable instruction stored in the memory to further configure the device to:

receive a behavior data obtaining request of a second terminal, wherein the behavior data obtaining request of the second terminal carries the anonymized target data; and determine, based on the anonymized target data, the behavior data generated when the target data is obtained.

17. The device according to claim 12, wherein the processor invokes the at least one programmable instruction stored in the memory to further configure the device to:

obtain, based on a character format of the at least one anonymized character string in the anonymized target data, the second permutation character sequence corresponding to each character format of the at least one character string;

extract a cyclically repeated character sequence from the anonymized target data, to obtain the watermark ciphertext sequence;

convert, for each character in the watermark ciphertext sequence, into a binary number, location information of the character in the second permutation character sequence corresponding to a character format of the character, to obtain a binary sequence; and convert the binary sequence into the behavior data.

18. A non-transitory computer-readable storage medium, wherein the storage medium comprises at least one instruction, and when the at least one instruction is run on a computer, the computer is enabled to perform the method according to claim 1.

\* \* \* \* \*